United States Patent
Kurisu et al.

(10) Patent No.: US 6,558,835 B1
(45) Date of Patent: May 6, 2003

(54) BATTERY MODULE OF PARALLEL ELECTRIC CELL ROD BODIES

(75) Inventors: Norihito Kurisu, Takasaki (JP); Koji Ishiwa, Maebashi (JP); Tsutomu Matsui, Takasaki (JP)

(73) Assignees: Toshiba Battery Co., Ltd., Tokyo (JP); Honda Giken Kogyo Kabushiki Kaisha, Tokyo (JP)

( * ) Notice: Subject to any disclaimer, the term of this patent is extended or adjusted under 35 U.S.C. 154(b) by 169 days.

(21) Appl. No.: 09/830,682

(22) PCT Filed: Aug. 30, 2000

(86) PCT No.: PCT/JP00/05867

§ 371 (c)(1),
(2), (4) Date: Apr. 30, 2001

(87) PCT Pub. No.: WO01/17044

PCT Pub. Date: Mar. 8, 2001

(30) Foreign Application Priority Data

Aug. 31, 1999 (JP) ............................................. 11-245808

(51) Int. Cl.[7] .................................................. H01M 6/42
(52) U.S. Cl. .......................... 429/159; 429/99; 429/156
(58) Field of Search .................................. 429/156, 158, 429/159, 99

(56) References Cited

U.S. PATENT DOCUMENTS 5,308,717 A * 5/1994 Gordin ........................ 429/99
5,578,392 A * 11/1996 Kawamura ................... 429/99
5,744,260 A * 4/1998 Sim .............................. 429/99
5,948,556 A * 9/1999 Hall ............................... 429/7
6,379,837 B1 * 4/2002 Takahashi .................... 429/151
6,399,238 B1 * 6/2002 Oweis ........................... 429/99

FOREIGN PATENT DOCUMENTS

| JP | 61-113370 | 7/1986 | |
| JP | 5-43461 | 6/1993 | |
| JP | 2000-100413 | 4/2000 | |
| JP | 2000-138051 | 5/2000 | |
| JP | 2001126691 | * 5/2001 | ............ H01M/2/10 |
| JP | 2001148235 | * 5/2001 | ............ H01M/2/10 |

* cited by examiner

*Primary Examiner*—Patrick Ryan
*Assistant Examiner*—Mark Ruthkosky
(74) *Attorney, Agent, or Firm*—Oblon, Spivak, McClelland, Maier & Neustadt, P.C.

(57) ABSTRACT

An electric cell module is provided, which enables operations of connecting terminals in one direction and which is, as a whole, highly rigid and has excellent resistance to breakage. A pair of rod bodies 3A and 3B are arranged parallel to each other to be oriented in opposite polarities. Each rod body contains a plurality of electric cells 1 connected in series through cell connector portions 2. An electrical connecting structure 4 is formed on one end face of each rod body. The structure connects the rod bodies electrically to each other. A coupling jig 5 is incorporated to surround at least one juxtaposed pair of cell connector portions present at the same longitudinal position in the rod bodies.

5 Claims, 6 Drawing Sheets

BATTERY MODULE OF PARALLEL ELECTRIC CELL ROD BODIES

TECHNICAL FIELD

The present invention relates to an electric cell module, more specifically to an electric cell module which is U-shaped as a whole to enable terminal connecting operations in one direction, which is highly rigid as a module to hardly undergo damage when subjected to external forces including vibration and also has a high natural frequency to undergo no damage under resonance with external vibrations, and which is suitably used as a power source for driving, for example, an electric vehicle.

BACKGROUND ART

There have recently been discussed use of nickel hydride rechargeable batteries as power sources for driving various kinds of machine tools, electric motor-assisted bicycles and electric vehicles. In such cases, for example, in an electric vehicle, an output voltage of 100 to 300 V is necessary.

In order to obtain such output voltage, a plurality of electric cells are usually connected in series to assemble an electric cell module, and after a plurality of such electric cell modules are connected in series, the resulting assembly of cell modules is supported by a supporting plate or the like and is as such contained in a container to assume an electric cell pack structure having a desired output voltage.

An example of the electric cell module is shown in FIG. 1. In this electric cell module A, five electric cells 1 are connected in series to assume a rod-shape as a whole. Here, if the rod-shaped module is covered entirely with a heat-shrinkage tube, it not only attains the primary objective of insulation but also can enhance the strength of the entire module. Cell connector portions 2 for connecting electric cells 1 generally have a structure described below.

The structure will be described based on FIG. 2 showing an exploded cross-sectional view.

First, there are prepared a dish-like connecting piece 2A that is made of a conductive material and has a stepped structure having a large-diameter portion and a small diameter portion, and also a ring-shaped intervenient piece 2B made of an insulating material. The upper opening in the large-diameter portion of the connecting piece 2A is of such a diameter as can permit insertion of a can bottom 1b of an electric cell to be connected thereby, whereas a through hole 2a permitting insertion of a positive terminal 1a of another electric cell to be connected is defined in the small-diameter portion.

Meanwhile, a through hole 2b permitting insertion of the small-diameter portion of the connecting piece 2A is formed in the intervenient piece 2B.

When electric cells 1 are connected to each other, the intervenient piece 2B is placed on the upper face of the lower electric cell 1, and then the connecting piece 2A is placed thereon. The intervenient piece 2B is located on an upper rim 1c of the lower electric cell 1, and the positive terminal 1a of that cell 1 penetrates through the through holes 2b and 2a to protrude into the small-diameter portion of the connecting piece 2A, and simultaneously the bottom face of the small-diameter portion is brought into contact with a positive plate 1d on which the positive electrode of the electric cell is formed.

Here, the small-diameter portion is designed to have a depth such that the bottom face thereof is brought into contact with the positive plate 1d, when these elements are arranged as described above.

Next, the small-diameter portion of the connecting piece 2A and the positive plate 1d of the electric cell on which the positive terminal is formed are subjected to resistance welding to fix the connecting piece 2A onto the top of the electric cell 1 and simultaneously to secure electrical connection therebetween.

Subsequently, a can bottom 1b of another electric cell 1 is put into the large-diameter portion of the connecting piece 2A to carry out, as such, resistance welding between the side face of the large-diameter portion of the connecting piece 2A and the can bottom 1b of the upper electric cell 1 to immobilize the upper cell 1 in the large-diameter portion of the connecting piece 2A and also to secure electrical connection between them.

Thus, two electric cells 1 are connected to each other mechanically and electrically through the connecting piece 2A. Here, the intervenient piece 2B is incorporated so as to prevent the short-circuiting phenomenon to be caused, for example, when the upper electric cell is tilted and as such brought into contact with the lower electric cell by a force like bending is applied to the entire electric cell module.

However, the conventional electric cell module A shown in FIG. 1 involves the following problems:

(1) Since the module as a whole assumes an I-shaped rod body and the cell connector portion 2 and each electric cell are connected to each other by resistance welding to form a point-connection structure, the module does not have very high strength and yields to external forces, particularly to flexural forces.

Therefore, for example, when a pack structure is to be assembled by containing the electric cell module A in a container such as of a synthetic resin, deliberate operations are required so that the modules are not bent. Meanwhile, troubles can happen that the electric cell module A is broken, if some external force is applied to the assembled pack structure.

(2) In this electric cell module A, the rod body composed essentially of electric cells connected in series has a positive terminal and a negative terminal at its ends respectively. Thus, when the rod body is contained in a container to assemble a pack structure, these terminals are to be connected to other parts in two directions. Further, when one operator performs this connecting operations, he or she must move from one position to another; whereas when two operators perform this operation, productivity in module assembly will be lowered.

(3) In addition, when the pack structure having the electric cell module A contained in a container is used as a drive power source of an electric vehicle and the like, the structure resonates with vibration of the vehicle itself or with external vibrations, due to the low natural frequency of the electric cell module A, to induce great vibrations, causing occasionally damage of the electric cell module A and other troubles.

While various kinds of automotive parts, taken for example, are subjected to tests according to the vibration testing methods for automobile parts of the Japanese Industrial Standards (JIS D1601) in the preset frequency range of 5 to 100 Hz. In order to solve the problems described above and in view of this circumstance, it is essential for electric cell modules to have a natural frequency of higher than 100 Hz so as to avoid the above frequency range.

It is an object of the present invention to provide an electric cell module of a novel structure, which has overcome the problems inherent in the conventional electric cell module A and which is, as a whole, highly rigid, enables terminal connecting operations in one direction and has a high natural frequency to be free from damage by resonance with vibrations applied thereto.

DISCLOSURE OF THE INVENTION

In order to attain the intended objective as described above, the present invention provides an electric cell module containing a pair of rod bodies arranged parallel to each other to be oriented in opposite polarities, each rod body containing a plurality of electric cells connected in series through cell connector portions; an electrical connecting structure formed on one end face of each rod body, the structure connecting the rod bodies electrically to each other; and a jig for coupling the rod bodies, the jig surrounding at least one juxtaposed pair of cell connector portions present at the same longitudinal position in the rod bodies.

BEST MODE FOR CARRYING OUT THE INVENTION

Figure 3:
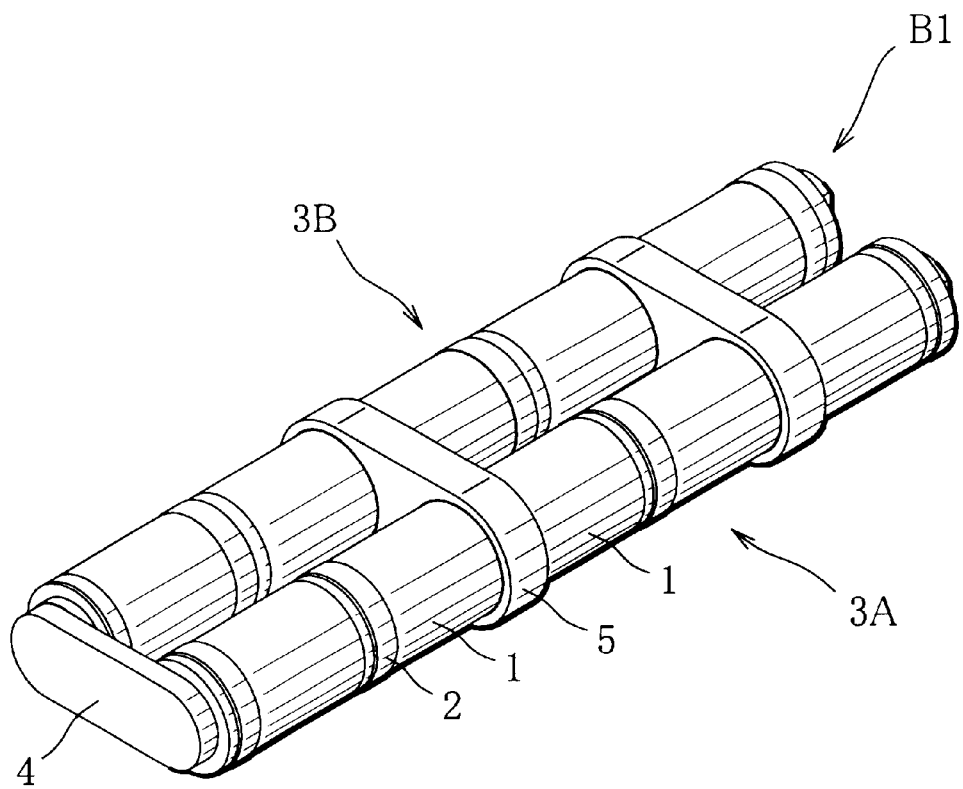
FIG. 3 is a perspective view of an electric cell module B1 according to one embodiment of the present invention.
Figure 4:
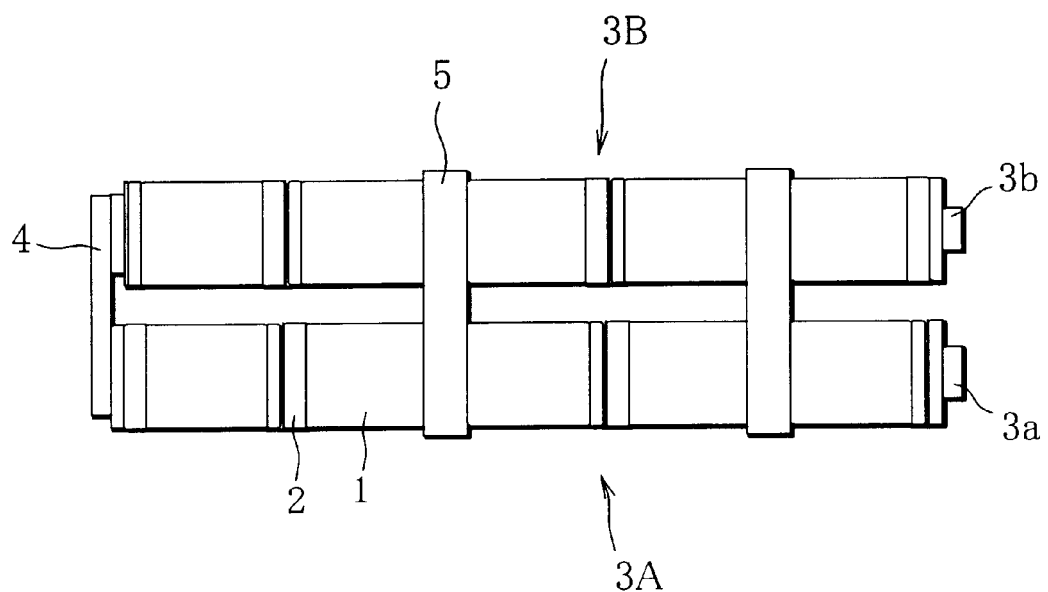
FIG. 4 is a plan view of the electric cell module B1.

Electric cell modules according to the present invention will be described below referring to the drawings. FIG. 3 is a perspective view of an electric cell module B1 according to one embodiment of the present invention; and FIG. 4 is a plan view thereof.

Figure 2:
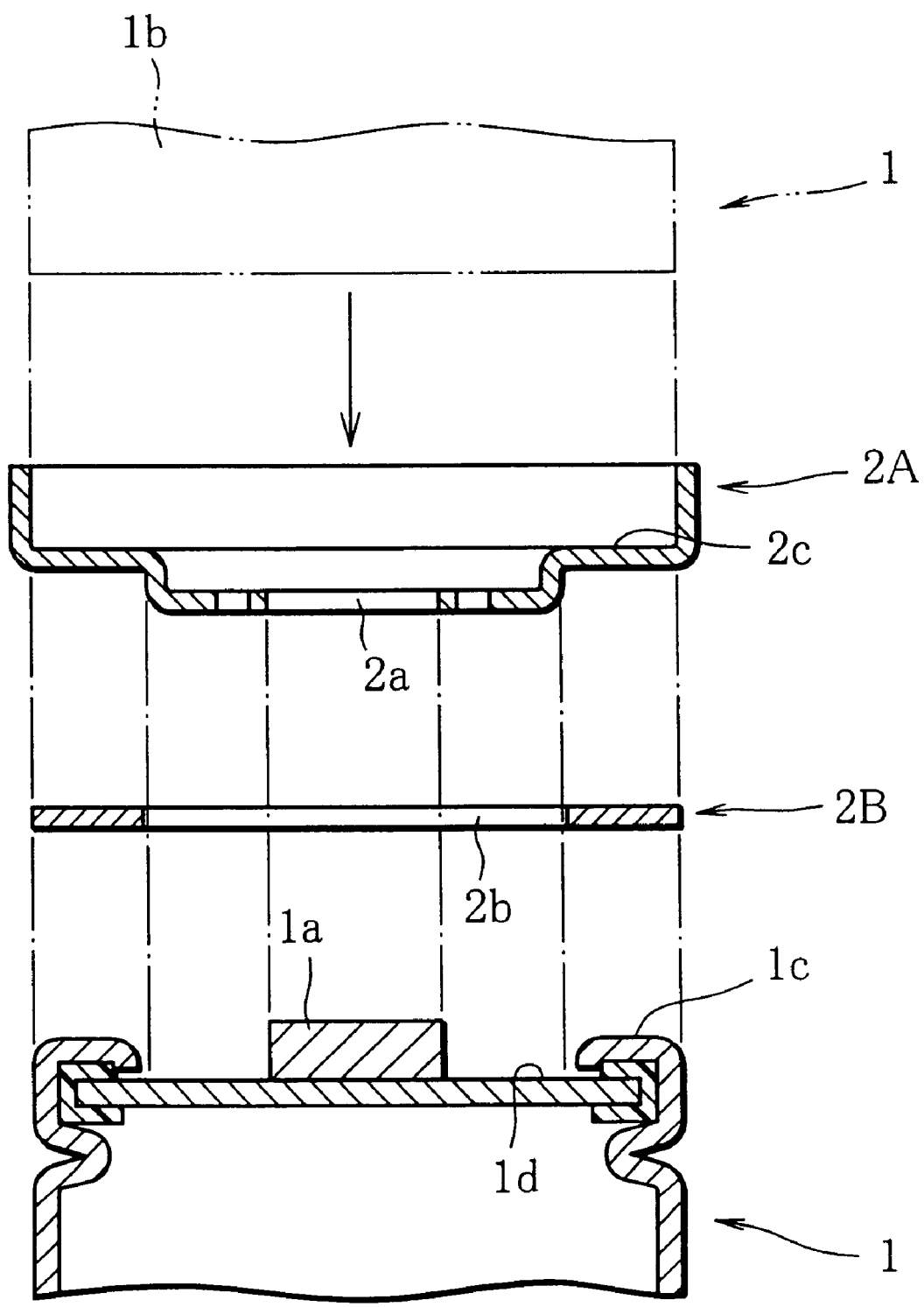
FIG. 2 is an exploded cross-sectional view of a cell connector.

This electric cell module B1 uses two rod bodies 3A and 3B each having five electric cells 1 connected in series. In this module B1, while the structure of the cell connector portions 2 for connecting electric cells 1 in each rod body is not particularly limited, it should be understood here that they have the connecting structure as shown in FIG. 2.

The rod bodies 3A and 3B are arranged parallel to each other with a very small clearance being secured crosswise therebetween and are oriented in opposite polarities. Thus, the cell connector portions 2 in one rod body and those in the other body are located substantially at the same longitudinal positions, respectively.

An electrical connecting structure to be described later is formed at one end of each rod body to secure serial electrical connection between the rod body 3A and the rod body 3B, and the thus connected rod bodies as a whole assume a U-shape.

In at least one juxtaposed pair of cell connector portions 2 (two pairs in FIG. 2) in the rod bodies 3A and 3B, a coupling piece 5 (to be described later) is incorporated to surround them, as a measure for reinforcing the rod bodies 3A and 3B.

Therefore, in the case of the electric cell module B1, a terminal (assuming that it is a positive terminal) 3a of the rod body 3A and a terminal (negative terminal) 3b of the rod body 3B are oriented in the same direction, and this enables terminal connecting operations in one direction.

Here, a method of assembling an electrical connecting structure 4 given here as an example will be explained referring to FIG. 5.

Figure 5:
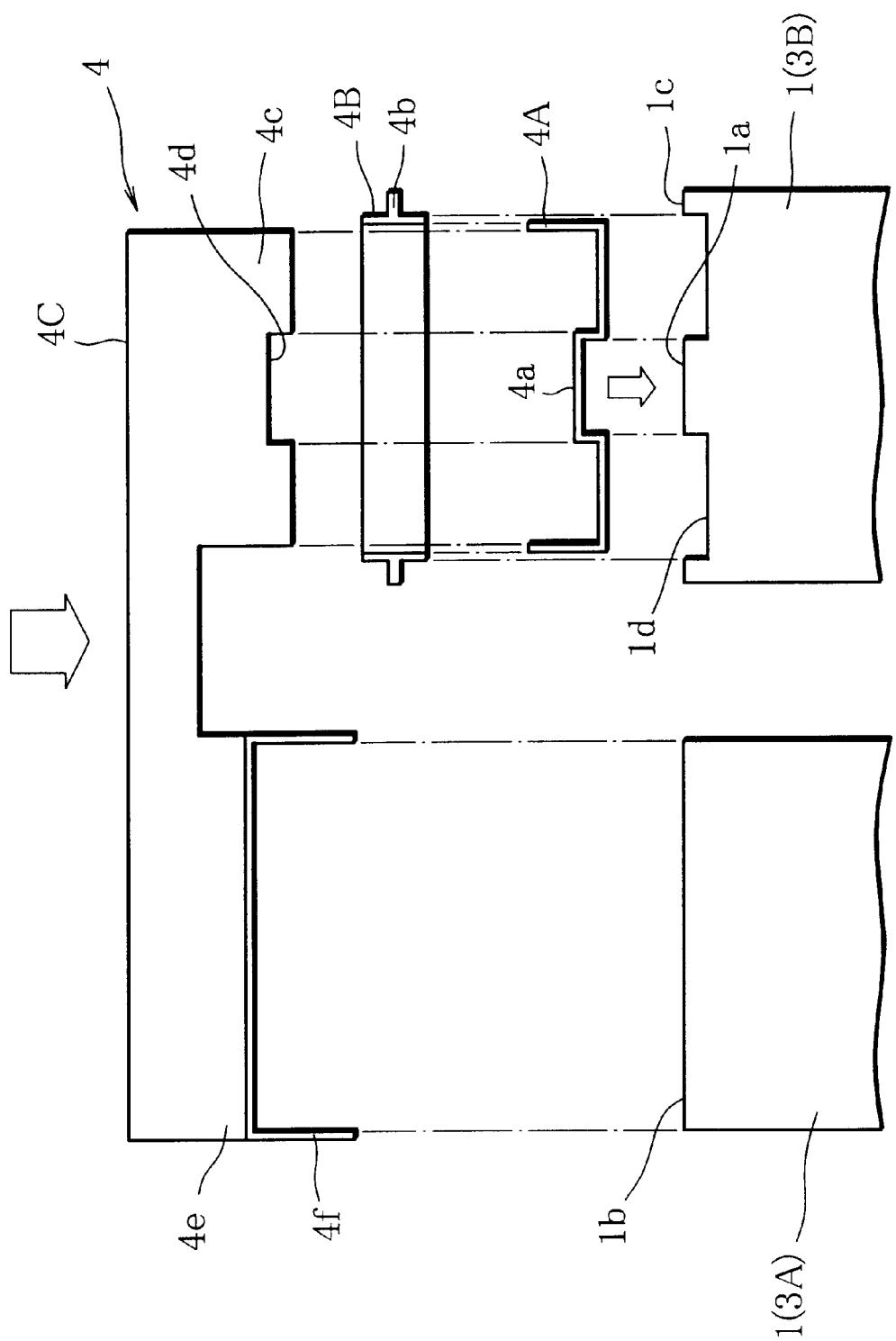
FIG. 5 shows in exploded cross-sectional view an electrical connecting structure in the electric cell module B1.

In FIG. 5, a dish-like jig 4A made of a conductive material is placed on the positive end of an electric cell 1 in the rod body 3B to be in contact with a positive terminal 1a of the cell 1 and with a positive plate 1d on which the terminal 1a is formed. This dish-like jig 4A has at the center a boss 4a having the same outline as that of the positive terminal 1a of the cell 1.

The dish-like jig 4A has an outside diameter such that a very small clearance is formed between the inner wall surface of an upper rim 1c of the electric cell 1 and the jig 4A, when the jig A is placed on the positive end of the cell 1.

Then, the positive terminal 1a, the positive plate 1d and the jig 4A are subjected to resistance welding to fix the jig 4A onto the positive end of the electric cell 1.

Next, an annular jig 4B, which is made of an insulating material and has a diameter slightly larger than the outside diameter of the jig 4A, a wall thickness equal to the width of the clearance and a collar 4b extending outward from the barrel, is fitted in the clearance. Thus, the jig 4B is supported at the collar 4b by the upper rim 1c of the electric cell, whereas the barrel of the jig 4B is located in the clearance between the jig 4A and the upper rim 1c. This structure prevents short-circuiting from occurring between the electric cells 1.

Meanwhile, a bus-bar structure 4C made of a conductive material such as copper is prepared. In this bus-bar structure 4C, one end portion 4c thereof has a diameter substantially equal to the inside diameter of the jig 4A and has at the center a recess 4d of substantially the same outline as the boss 4a of the jig 4A. The other end portion 4e has a dish-shaped body 4f fixed thereto by means of resistance welding. The dish-shaped body 4f has a diameter substantially equal to that of the can bottom 1b of the electric cell 1 in the rod body 3A.

Then, the end portion 4c of the bus-bar structure 4C is fitted in the jig 4A, whereas the can bottom 1b of the electric cell 1 in the rod body 3A is fitted in the dish-shaped body 4f, thus forming an electrical connecting structure 4 for connecting the rod body 3A and the rod body 3B electrically to each other.

It should be noted here that the electrical connecting structure in the electric cell module according to the present invention is not to be limited to the above embodiment, but other embodiments can be employed. For example, the bus-bar structure is bridged between the terminals 3a and 3b of the rod bodies and is fastened to the terminals 3a and 3b using bolts or other means. Meanwhile, other conductive materials employable here include metallic materials based on copper including brass, aluminum alloys and nickel-plated iron.

Next, the coupling piece 5 to be incorporated between two rod bodies will be described.

Figure 6:
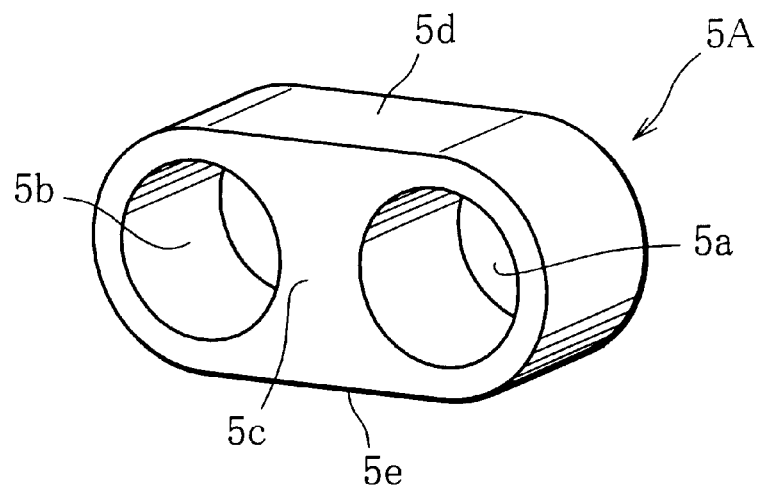
FIG. 6 shows in perspective view an example of coupling piece 5A.

FIG. 6 shows an example of coupling piece 5A. The coupling piece 5A is a block having a predetermined thickness and a curved face one each side. The block contains a pair of through holes 5a and 5b defined at a predetermined interval.

Here, the through holes 4a and 5b have diameters substantially equal to the outside diameters of the rod bodies 3A and 3B, and the portion 5c between the through holes 5a and 5b is as wide as the clearance between the rod body 3A and the rod body 3B and serves as a spacer for holding the rod bodies with a certain clearance.

Referring to assembling of the electric cell module B1 shown in FIG. 3, the rod bodies 3A and 3B are inserted to the through holes 5a and 5b of the coupling piece 5A, respectively. The coupling piece 5A is then located on a desired juxtaposed pair of cell connector portions 2.

The pair of cell connector portions 2 are surrounded by the walls of the through holes 5a and 5b, while the coupling piece 5A is incorporated between the rod body 3A and the rod body 3B to hold them with a predetermined clearance secured therebetween. Even if a flexural force is applied to the rod bodies, the coupling piece 5A controls bending of the rod bodies to effectively prevent breakage of the module at the electrical connecting structure 4 when functioned as a fulcrum.

The coupling piece 5A preferably has a thickness equal to or slightly greater than the width of the cell connector portion 2. The walls of the through holes 5a and 5b in the coupling piece 5A surround the cell connector portions 2 completely to protect them, so that deformation including, for example, dislocation and bending between two electric cells connected by the cell connector portion 2 can more effectively be controlled.

Further, the coupling piece 5A desirably has a flat upper face 5e and a flat lower face 5e. In the case of an electric cell module B1 assembled using such coupling pieces 5A, a plurality of cell modules can be directly stacked successively by bringing such flat faces into contact with each other. More specifically, the supporting plate (not shown) serving also as a cell module holder having been necessary in the case of the packed structure where the conventional electric cell modules are contained in a synthetic resin container or the like, can be omitted, facilitating assembling of the pack structure.

Meanwhile, if recesses and protrusions which are engageable with each other are formed on the upper face and the lower face respectively to constitute an engagement structure, it ensures not only stacking of electric cell modules but also realization of the structure for supporting them.

Figure 7:
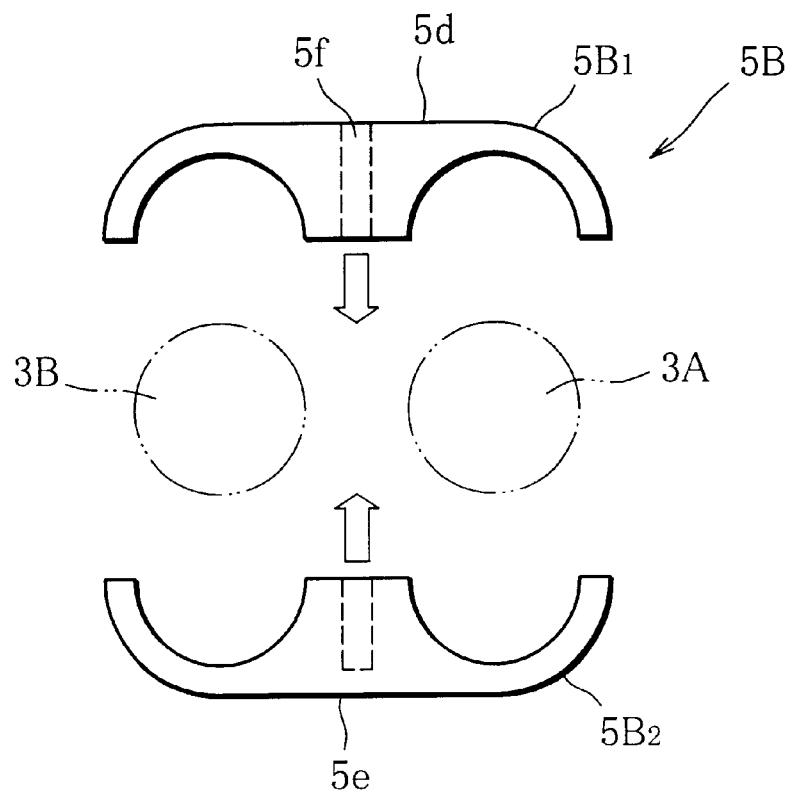
FIG. 7 shows in front view another example of coupling piece 5B.

FIG. 7 shows another example of coupling piece 5B.

This coupling piece 5B has a double-split structure composed of an upper half $5B_1$, and a lower half $5B_2$. These halves $5B_1$ and $5B_2$ each contain two semicircular curved surfaces which form, when combined, two circular holes having a diameter substantially equal to those of the rod bodies 3A and 3B. A screw hole 5f or the like is defined in the upper half $5B_1$, as well as, in the lower half $5B_2$ in alignment with each other, so that these halves can be combined and fastened together by screwing a screw into these screw holes.

When the coupling piece 5B is to be incorporated between the rod body 3A and the rod body 3B, the upper half $5B_1$ and the lower half $5B_2$ are located to oppose each other across a desired juxtaposed pair of cell connector portions, as shown in FIG. 7, and are combined with each other, followed by fastening by screwing a screw into the screw holes 5f.

The rod body 3A and the rod body 3B are surrounded by the walls of circular through holes defined by the semicircular faces of the upper half and the lower half, and coupling pieces 5B each composed of the upper half and the lower half are incorporated between the rod body 3A and the rod body 3B to give an assembled electric cell module B1 as shown in FIG. 3.

The coupling piece 5B having such a structure can suitably be used even when the diameters of the rod bodies are different from the bore diameters of the through holes. Because the coupling piece 5B can be incorporated between a pair of rod bodies to surround the desired juxtaposed pair of cell connector portions securely by combining the halves and adjusting the degree of fastening them with a screw. For example, even in a case of rod bodies each covered with a heat-shrinkage tube, this coupling piece 5B can be incorporated readily between such rod bodies.

Further, the means of fixing the rod bodies using this coupling piece 5B include, in addition to the screw to be screwed into the center of the coupling piece 5B, one where the upper half $5B_1$ and the lower half $5B_2$ are fastened to each other at each side end; e.g., a hinge or the like is fixed to one side end of the upper half $5B_1$, and to that of the lower half $5B_1$, while a hook or the like is attached to the other side end of the upper half $5B_1$ or the lower half $5B_2$ and the hook is hooked onto the rest of them so as to fasten them together; or a hook is attached to each side end of the upper half $5B_1$ or the lower half $5B_2$ and the hooks are hooked onto the rest of them so as to fasten them together.

It is preferred to apply an elastic body such as a rubber to the walls of the through holes 5a and 5b in the coupling piece 5A or to the semicircular curved faces of the upper half $5B_1$ and the lower half $5B_1$, in the coupling piece 5B. That is, if an elastic body is applied to such faces of the coupling piece surrounding the rod bodies, the elastic body securely blocks the clearance present between the coupling piece and the rod bodies to prevent backlash from occurring between them after incorporation of the coupling piece.

Figure 8:
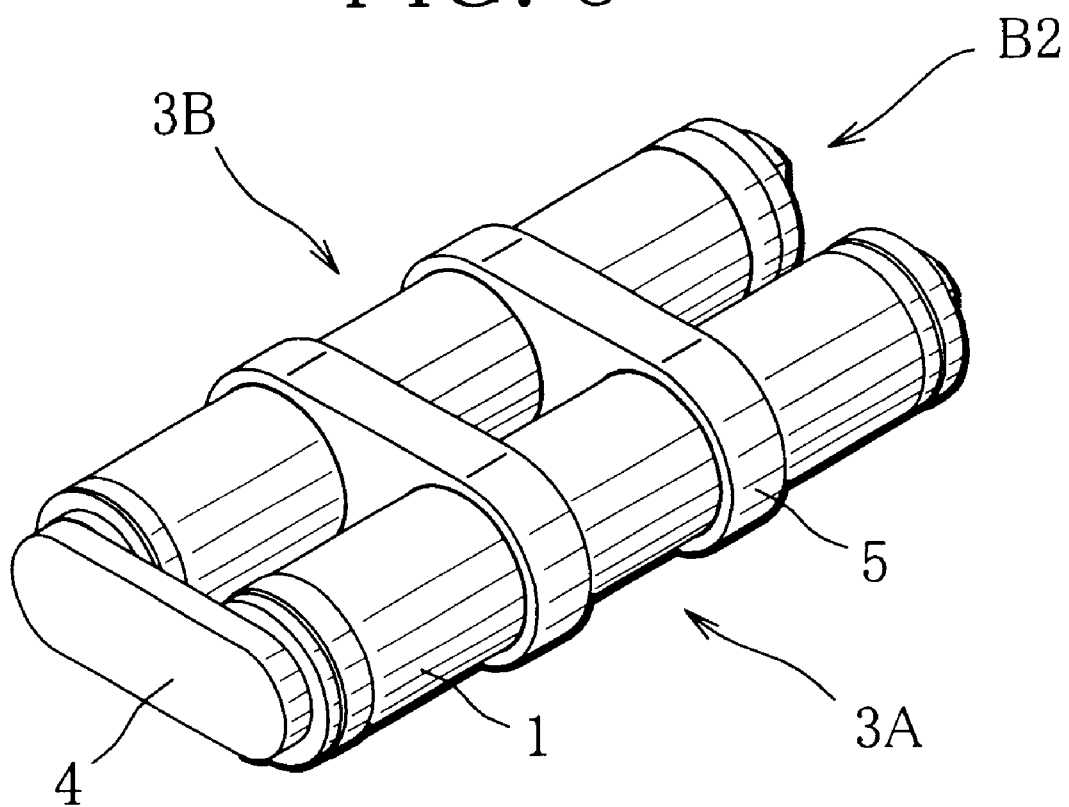
FIG. 8 is a perspective view of an electric cell module B2 according to another embodiment of the present invention.

FIG. 8 shows an electric cell module B2 according to another embodiment of the present invention. In the case of this electric cell module B2, three electric cells 1 are connected in series to form a rod body 3A (3B). The thus obtained rod bodies 3A and 3B are connected to each other with the electrical connecting structure 4 described above, and coupling pieces 5 are attached to all of the cell connector portions (two pairs of cell connector portions in this case) to surround them, respectively.

In this electric cell module B2, since the cell connectors are all immobilized with the coupling pieces 5 respectively, the module B2 as a whole is highly rigid compared with the module B1 and enjoys high reliability in terms of resistance to breakage.

As described above, the electric cell module according to the present invention assumes a U-shape having coupling pieces incorporated between a pair of rod bodies to enable terminal connecting operations in one direction. In addition, since the coupling pieces securely hold a pair of rod bodies, the electric cell module has a structure that controls damage by resonance with external vibrations.

EXAMPLE

A pair of rod bodies 3A and 3B each having a total length of 270 mm were fabricated using five electric cells having a diameter of 32 mm and a height of 50 mm for each rod body. An electric cell module B1 as shown in FIG. 3 was assembled using these rod bodies. Here a clearance of 41 mm was secured between the rod bodies 3A and 3B.

Natural frequency of the electric cell module B1 was measured in the following manner.

The electric cell module B1 was bound with a string at the center of the electrical connecting structure and was suspended with it. An acceleration sensor was attached to the distal electric cell in one of the rod bodies. In the state where the module B1 is supported to have free ends, the module B1 was hammered to measure the natural frequency with the acceleration sensor.

Figure 1:
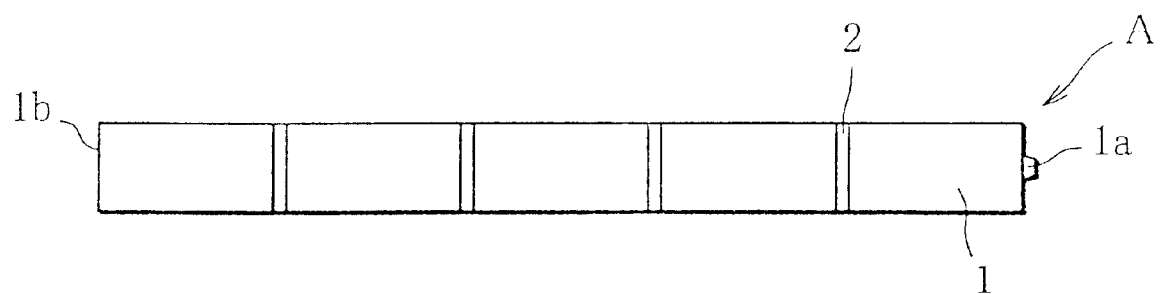
FIG. 1 shows in plan view an example of conventional electric cell module.

As a comparative example, natural frequency of the conventional electric cell module A shown in FIG. 1 was measured likewise.

The electric cell module B1 had a natural frequency of 120 Hz; while the electric cell module A had a natural frequency of 85 Hz.

As is clear from these results, the electric cell module B1 of the present invention (example) had a natural frequency of higher than 100 Hz, although the conventional electric cell module A (comparative example) had a natural frequency of 85 Hz. Therefore, the electric cell module B1 of the present invention undergoes no damage, since it resonates neither with the vibration of the electric vehicle itself nor with external vibrations to undergo no sympathetic vibration.

INDUSTRIAL APPLICABILITY

The electric cell module according to the present invention as a whole assumes a U-shape to enable terminal connecting operations in one direction, and enjoys excellent handleability in actual uses. Since the electric cell module is provided with a pair of rod bodies, each containing a plurality of electric cells, and coupling pieces incorporated between the rod bodies to surround them, the cell connector portions are reinforced by the coupling pieces, so that the module shows excellent resistance to flexural forces and is as a whole highly rigid. Thus, if the electric cell module is used actually as a power source for driving, for example, an electric vehicle or a machine tool, it does not resonate with vibrations of the vehicle or the tool to hardly undergo troubles including breakage.

What is claimed is:

1. An electric cell module, comprising:

a pair of rod bodies arranged parallel to each other to be oriented in opposite polarities, each rod body containing a plurality of electric cells connected in series through cell connector portions;

an electrical connecting structure formed on one end face of each rod body, the structure connecting the rod bodies electrically to each other;

and a jig for coupling the rod bodies, the jig surrounding at least one juxtaposed pair of cell connector portions present at the same longitudinal position in the rod bodies.

2. The electric cell module according to claim 1, wherein the jig for coupling the rod bodies has a double-split structure.

3. The electric cell module according to claim 1, wherein the jig for coupling the rod bodies has on the faces surrounding the cell connector portions an elastic body.

4. The electric cell module according to claim 1, wherein the electrical connecting structure is made of copper, a copper-based metal, an aluminum alloy or nickel-plated iron.

5. The electric cell module according to claim 2, wherein the jig for coupling the rod bodies has on the faces surrounding the cell connector portions an elastic body.

* * * * *